United States Patent Office 3,798,142
Patented Mar. 19, 1974

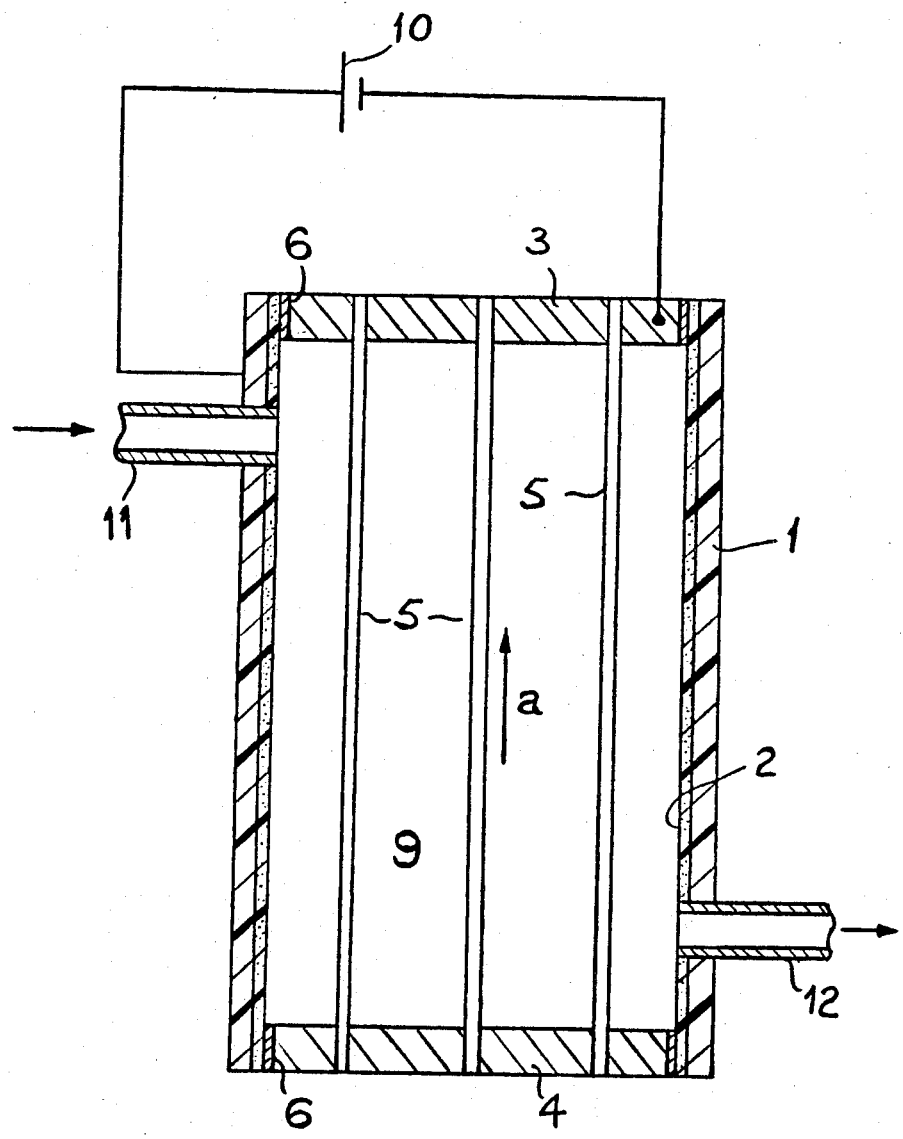

3,798,142
CORROSION PROTECTION
Lee Stanley Evans, Rugby, England, assignor to
Courtaulds Limited, London, England
Continuation-in-part of abandoned application Ser. No. 64,591, Aug. 17, 1970. This application Apr. 20, 1972, Ser. No. 245,752
Claims priority, application Great Britain, Aug. 28, 1969, 42,793/69
Int. Cl. C23f 13/00
U.S. Cl. 204—147                                                                 8 Claims

ABSTRACT OF THE DISCLOSURE

A corrosion resistant structure which comprises plastics material and metal, the plastics material having carbon fibres incorporated therein at such a concentration as to render at least part of the plastics material electrically conducting, the pastics material and the metal each having means for electrically connecting them to a source of electrical supply so that the metal is electrochemically protected. Examples of such structures are heat exchangers and boats with glass fibre-reinforced hulls.

---

This application is a continuation-in-part of application Ser. No. 64,591, filed Aug. 17, 1970, now abandoned.

This invention relates to a corrosion resistant structure and to a method of protecting a structure from corrosion.

A structure comprising plastics material and metal has the advantage, compared with a structure made entirely of metal, of the better corrosion resisting properties of the plastics material. It has the disadvantage, however, that plastics materials are very poor conductors and cannot therefore be used as electrodes in, for example, a cathodic protection method. Therefore, if the metal part of such a structure is to be protected electrochemically, then an additional electrode usually has to be provided.

The invention provides an improved corrosion resistant structure which does not have the above mentioned disadvantage and which, at the same time, strengthens the structure and does not decrease the corrosion resistance of the plastics material.

According to the invention, a corrosion resistant structure comprises plastics material and metal, the plastics material having carbon fibres incorporated therein at such a concentration as to render at least part of the plastics material electrically conducting, the plastics material and the metal each having means electrically connecting them to a source of electrical supply and being otherwise electrically insulated from each other. Advantageously, the part of the plastics material rendered electrically conducting is a layer of the plastics material, such as a surface layer.

To facilitate electrical connection to the electrically conducting layer, at least one metal conductor, for example a strip of wire, may be provided. A terminal or stud may be connected to the or each conductor, for example where it emerges through the surface of the plastics material. The metal conductor or conductors are usually laid in with the carbon fibres.

The plastics material of the structure may be thermoplastic or thermosetting plastics and may incorporate, if desired, fillers or other additives including reinforcing material, which may or may not be carbon fibre.

The expression "carbon fibres" refers to fibres, either in staple or continuous filament form, which consist essentially of carbon, and especially those fibres which have been prepared by carbonizing organic filamentary material such as cellulosic, polyester and polyamide fibres; particularly suitable are carbon fibres which are prepared by carbonizing filamentary material which consists wholly or mainly of polyacrylonitrile. Suitable carbon fibres for use in the process of the invention include carbonized fibres which have been subjected to a final temperature in excess of 1000° C. and fibres having a more or less graphitic structure which have been subjected to considerably higher temperature, up to about 3000° C.

The use of carbon fibres gives the advantage of increasing the strength of the structure with a low weight increase, and without detracting from the corrosion resistance of the plastics material.

A preferred form of the invention is a heat exchanger, where the metal may comprise at least one metal tube and the plastics material a plastics shell, the or each tube being arranged within the shell, the internal layer of which has carbon fibres incorporated therein to provide an electrically conducting layer. In use, the internal layer is connected to one polarity of an electrical supply source and the metal to the other. A difference in electrical potential is thereby set up between the metal and the internal layer. The metal tube or tubes are thus protected electrochemically from corrosion by fluids, which may pass inside and outside the tube or tubes, in a simple yet effective manner which requires no space-taking additional electrodes to be provided. Also, the distance between the electrode and the metal is minimized, resulting in increased efficiency of the electrochemical protection.

Another form of this invention is a boat wherein the plastics material comprises, for example, a glass fibre reinforced hull and the metal a metal propeller. The incorporation of carbon fibre in the hull enables electrochemical protection of the propeller to be effected, without any unnecessary increase in weight, or decrease in hydrodynamic efficiency.

According to a further aspect of the invention, a method of protecting a structure comprising plastics material and metal from corrosion, the plastics material having carbon fibres incorporated therein at such a concentration as to render at least part of the plastics material electrically conducting, comprises electrically connecting the plastics material as an electrode to one polarity of a source of electrical supply and electrically connecting the metal as another electrode to the other polarity of the source of electrical supply whilst otherwise maintaining the plastics material and the metal electrically insulated from each other.

The following example illustrates a method of incorporating carbon fibres into a plastics material.

EXAMPLE

A hollow cylinder of reinforced polyester resin, the internal surface of which was highly conducting, was prepared as follows:

Two semi-cylindrical moulds, of internal radius 15 cm. and 150 cm. long were laid up with polyester resin and glass fibre mat to form the outer surfaces of two half cylinders, and to a thickness of 6.3 mm. A layer of carbon fibre mat was laid on the inside surfaces of the first applied layers and further resin was added. A strip of lead, 120 cm. long by 12.5 mm. wide by 1.57 mm. thick was laid on top of the carbon fibres in each mould, and a further layer of carbon fibre mat was laid above the lead with a little more resin. Two studs attached to the lead projected as contacts. After the resin had gelled, the two halves were removed from the moulds and attached together to form a complete cylinder. Further layers of glass mat, glass rovings and resin were added to the outside of the cylinder to build up the wall thickness and give the required strength. Without any further treatment the resistance between the interior surface of the cylinder and the contact studs was found to be less than 20 ohms.

In the conducting layer so produced, there is approximately 90 percent of carbon fibres (by volume).

The invention will now be illustrated, by way of example only, with reference to the accompanying drawing, the single figure of which is a schematic cross-sectional view of a heat exchanger.

Referring to the drawing, a cylindrical shell 1, made of plastics material, has carbon fibres incorporated into its internal layer 2 to provide an electrically conducting layer. This layer is connected to the positive pole of source of electrical supply constituted by the 12 volt D.C. output of a rectifier 10. A chamber 9 is defined by the shell 1, and upper metal cap 3 and a lower metal cap 4, the caps 3 and 4 each being firmly seated in opposite ends of the shell 1 and electrically insulated from the internal layer 2 of the shell by insulation sleeves 6. The upper cap 3 is connected to the negative D.C. pole of the rectifier 10.

The chamber 9 has an inlet duct 11 for supplying fluid and an outlet duct 12 for removing fluid. Arranged symmetrically within the chamber 9 are twenty cylindrical tubes 5, of which only three are shown. Each tube 5 extends beyond the chamber 9 at its upper and lower ends and fits securely in the upper cap 3 and the lower cap 4. At their lower ends, the tubes 5 are connected to a common inlet chamber (not shown) and at their upper ends, to a common outlet chamber (not shown).

The shell 1 may, for example, be made of glass fibre-reinforced polyester resin and the caps 3 and 4 and the tubes 5 may, for example, be made of titanium.

In operation of the heat exchanger shown in the drawing, a first fluid is passed into the chamber 9 from the inlet duct 11. A second fluid is passed through the tubes 5 from the inlet chamber (not shown) in the direction indicated by the arrow a. Heat exchange takes place between the two fluids. The first fluid issues from the chamber 9 via the outlet duct 12 and the second fluid issues from the tubes 5 into the outlet chamber (not shown). The tubes 5 constitute the cathode in an electrolytic cell and are thereby protected from corrosive attack by the fluids.

An example of the application of the heat exchanger shown in the drawing is where the first fluid is steam contaminated with sulphuric acid and the second fluid is a dilute sulphuric acid solution.

What is claimed is:

1. A corrosive resistant structure which comprises plastics material and metal, the plastics material having carbon fibers incorporated therein at such a concentration as to render at least part of the plastics material electrically conducting, the plastics material and the metal having means electrically connecting them respectively to the positive and negative poles of a source of electrical supply, said plastics material and the metal being otherwise insulated from each other.

2. A structure according to claim 1 wherein the part of the plastics material rendered electrically conducting is a surface layer of the plastics material.

3. A structure according to claim 1 in the form of a heat exchanger.

4. A structure according to claim 3 wherein the metal comprises at least one metal tube and the plastics material a plastic shell, the tube or tubes being arranged within the shell, the internal layer of which has carbon fibres incorporated therein to provide an electrically conducting layer.

5. A structure according to claim 1 in the form of a boat, wherein the plastics material comprises a glass fibre reinforced hull and the metal a metal propeller.

6. A structure according to claim 1, wherein the means for electrically connecting the plastics material to a source of electrical supply is provided by at least one metal conductor which is laid in with the carbon fibres.

7. A structure according to claim 6, wherein terminal means is connected to the metal conductor.

8. A method of protecting a structure comprising plastics material and metal from corrosion, the plastics material having carbon fibers incorporated therein at such a concentration as to render at least part of the plastics material electrically conducting, which comprises electrically conducting, which comprises electrically connecting the plastics material as an electrode to the positive pole of a source of electrical supply and electrically connecting the metal as another electrode to the negative pole of the source of electrical supply while otherwise maintaining the plastics material and the metal electrically insulated from each other.

References Cited

UNITED STATES PATENTS

| | | | |
|---|---|---|---|
| 921,641 | 5/1909 | Cumberland | 204—196 |
| 1,020,480 | 3/1912 | Cumberland | 204—196 |
| 1,032,723 | 7/1912 | Young | 204—196 |
| 2,053,214 | 9/1936 | Brown | 204—196 |
| 2,556,830 | 6/1951 | Thrune | 204—294 |
| 3,151,050 | 9/1964 | Wilburn | 204—147 |
| 3,169,504 | 2/1965 | Gruber | 204—196 |
| 3,497,434 | 2/1970 | Littauer | 204—147 |

TA-HSUNG TUNG, Primary Examiner

U.S. Cl. X.R.

114—.5 R, 222; 165—186; 204—196